US007526321B2

(12) United States Patent　　(10) Patent No.: US 7,526,321 B2
Liu　　(45) Date of Patent: Apr. 28, 2009

(54) WIRELESS NETWORK APPARATUS AND METHOD OF CHANNEL ALLOCATION FOR RESPECTIVE RADIOS

(75) Inventor: I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 588 days.

(21) Appl. No.: 11/297,095

(22) Filed: Dec. 8, 2005

(65) Prior Publication Data

US 2007/0135168 A1　Jun. 14, 2007

(51) Int. Cl.
*H04M 1/00* (2006.01)
(52) U.S. Cl. .................... 455/562.1; 455/121; 455/561; 455/272.2; 375/296; 375/222
(58) Field of Classification Search .............. 455/562.1, 455/121, 561, 272.2; 375/296, 222, 267
See application file for complete search history.

(56) References Cited

U.S. PATENT DOCUMENTS

| | | | | |
|---|---|---|---|---|
| 5,355,512 | A * | 10/1994 | Profera, Jr. .................. 455/13.3 |
| 5,457,688 | A * | 10/1995 | Andersen ..................... 370/449 |
| 5,572,216 | A * | 11/1996 | Weinberg et al. ....... 342/357.06 |
| 6,351,499 | B1 | 2/2002 | Paulraj et al. ................ 375/267 |
| 6,694,155 | B1 * | 2/2004 | Chin et al. ................ 455/562.1 |
| 6,701,137 | B1 * | 3/2004 | Judd et al. ................... 455/121 |
| 6,795,424 | B1 * | 9/2004 | Kapoor et al. ............... 370/343 |
| 6,823,170 | B1 * | 11/2004 | Dent .......................... 455/13.3 |
| 7,260,141 | B2 * | 8/2007 | Bierly et al. ................. 375/222 |
| 7,280,848 | B2 * | 10/2007 | Hoppenstein ................ 455/561 |
| 7,305,211 | B2 * | 12/2007 | Dent .......................... 455/12.1 |
| 7,359,733 | B2 * | 4/2008 | Liang et al. ............... 455/562.1 |
| 2002/0154687 | A1 * | 10/2002 | Bierly et al. ................. 375/222 |
| 2004/0132414 | A1 * | 7/2004 | Sendyk et al. ................ 455/73 |
| 2004/0204109 | A1 * | 10/2004 | Hoppenstein ............. 455/562.1 |
| 2005/0195734 | A1 * | 9/2005 | Sandell et al. .............. 370/208 |
| 2006/0133535 | A1 * | 6/2006 | Jung et al. ................... 375/296 |
| 2006/0281494 | A1 * | 12/2006 | Wilson et al. ............ 455/562.1 |
| 2006/0286955 | A1 * | 12/2006 | Yoshida .................... 455/277.2 |

* cited by examiner

*Primary Examiner*—Matthew D Anderson
*Assistant Examiner*—Minh D Dao
(74) *Attorney, Agent, or Firm*—Thomas, Kayden, Horstemeyer & Risley (57) ABSTRACT

A method of channel allocation for respective radios is disclosed. The method begins by scanning within sectors of a phased array for retrieval of BSSIDs belonging to each beam of a particular channel in the sectors. Then, corresponding characterizing information is recorded for every BSSID located. Next, an initial channel allocation for the respective radios is formed. The initial channel allocation is compared with a plurality of predetermined channel allocation modes that include a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage, and a mode out of the predetermined channel allocation modes is selected that best characterizes the initial channel allocation. The radios are configured based on the channel allocation and unbalanced loading is reduced by adding/subtracting a non-overlapped frequency channel of a radio to an unbalanced beam.

13 Claims, 14 Drawing Sheets

| Phase array type | Butler Matrix(ports) |
|---|---|
| Planar | 2/4/8 |
| Sectored | 2/4/8 |
| Quadrate | 2/4/8 |
| Hexahedral | 2/4 |
| Octahedral | 2/4 |

| Beam ports | Channels |
|---|---|
| 1R | 36 |
| 4L | 40 |
| 3R | 44 |
| 2L | 48 |
| 2R | 52 |
| 3L | 56 |
| 4R | 60 |
| 1L | 64 |

WIRELESS NETWORK APPARATUS AND METHOD OF CHANNEL ALLOCATION FOR RESPECTIVE RADIOS

BACKGROUND OF THE INVENTION

1. Field of the Invention

The invention relates in general to network apparatus, and more particularly to wireless network apparatus, and method of channel allocation for respective radios.

2. Description of the Related Art

In wireless communications, the need for an increase in capacity is evident as subscriber numbers continue to grow and offset traffic loading, as typically observed in major metropolitan networks.

A solution towards alleviating capacity constraints is to adopt smart antennas for wireless switch system in local and metropolitan networks. With smart antennas, service providers can add network capacity incrementally in areas where it's needed. This flexibility allows the service providers to respond to the characteristics of individual cell sectors, which can have significantly different traffic loads. Owing to such capabilities, smart antennas provide as a cost-effective way for increasing capacity and balancing traffic loads in high-usage areas.

Figure 1:
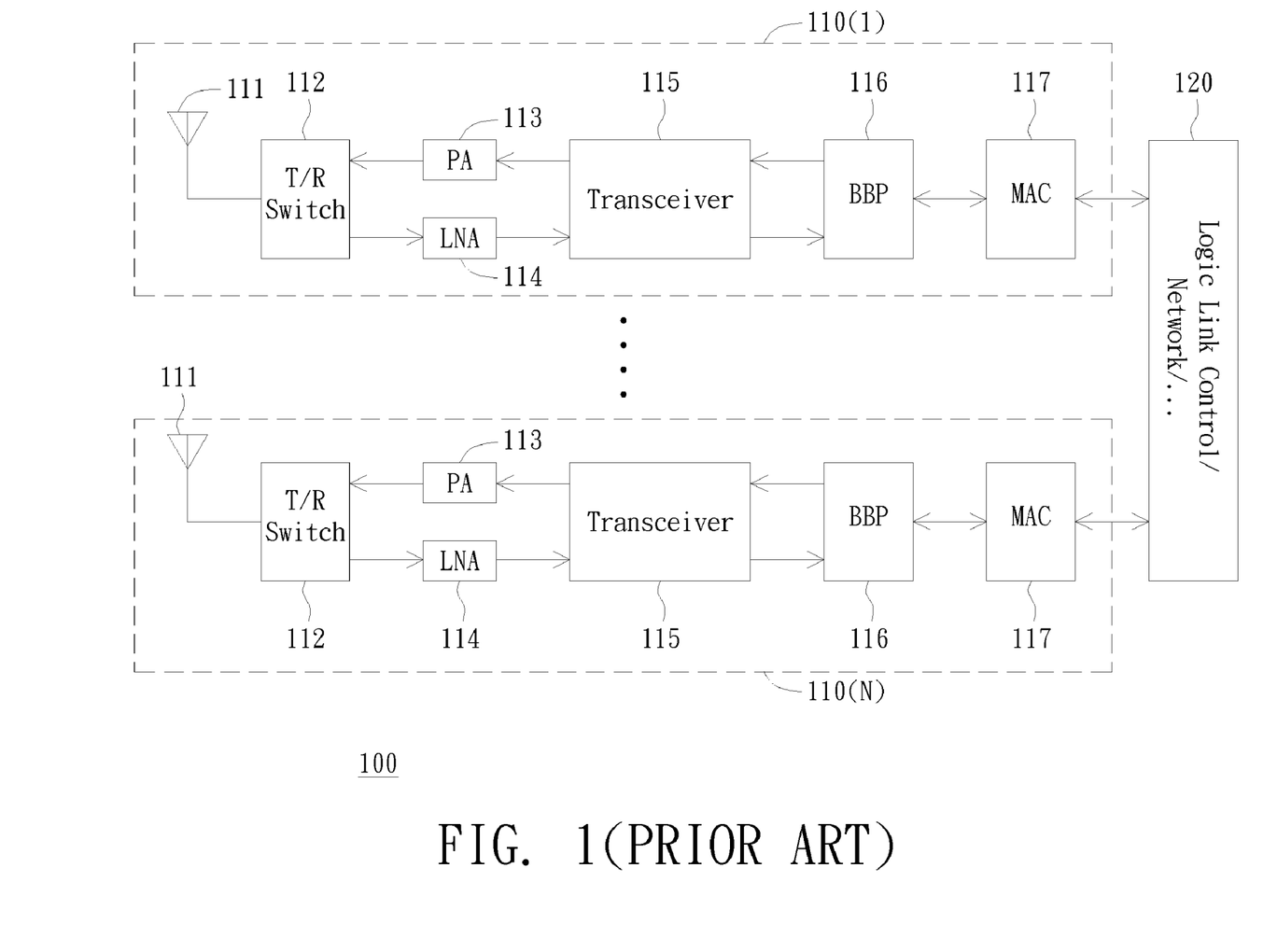
FIG. 1 shows block diagram of a conventional wireless Switch system connected to multiple radios.

FIG. 1 shows block diagram of a conventional wireless switch system connecting multiple radios to a higher layer control. The wireless switch system 100 includes a plurality of radios 110(1)-110(N) and a logic link control layer(LLC) 120. The radios 110(1)-110(N) each includes an antenna element 111, a transmitter/receiver (T/R) switch 112, a power amplifier (PA) 113, a low-noise amplifier (LNA) 114, a transceiver 115, a baseband processor (BBP) 116, and a media access control (MAC) layer 117. The radios are connected to the link logic control (LLC) layer 120 via the MAC layer 117. As shown in the figure, the radios 110(1)-110(N) operate independently from one other. The wireless switch system 100 balances the traffic load by adjusting sector size and orientation and varying cell's effective radiated power.

However, such loosely integrated and non-co-located radio configuration can neither provide adaptation for beam and/or frequency channel allocation to optimize pattern and/or spectrum efficiencies, nor provide controllable and effective isolations among beams and/or frequency channels. Further, the independent arrangement of the plurality of radios can neither offer array gain to extend link range, nor offer multiple bandwidths to extend link throughput.

SUMMARY OF THE INVENTION

It is therefore an object of the invention to provide a method of channel allocation for respective radios to reduced unbalanced traffic loading.

The invention achieves the above-identified object by providing a method of channel allocation for respective radios. The method begins by scanning within sectors of a phased array for retrieval of BSSIDs belonging to each beam of a particular channel in the sectors. Then, corresponding characterizing information is recorded for every BSSID located. Next, an initial channel allocation for the respective radios is formed. The initial channel allocation is compared with a plurality of predetermined channel allocation modes that include a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage, and a mode out of the predetermined channel allocation modes are selected that best characterizes the initial channel allocation. A track mode is then performed by assigning frequency channels to the respective radios based on the selected mode out of the predetermined channel allocation modes, whereby best application among the four predetermined channel allocation modes is achieved. Then, traffic within the sectors is being monitored, and unbalanced loading is reduced by adding/subtracting a non-overlapped frequency channel of a radio to an unbalanced beam.

It is yet another object of the invention to provide a wireless network apparatus to reduce unbalanced traffic loading.

The invention achieves the above-identified object by providing a wireless network apparatus. The apparatus includes an antenna array, a beamforming network, a plurality of radios, and a control circuit. Then antenna array includes a plurality of antenna elements each having an output antenna port. The beamforming network includes a plurality of inputs coupled to the output antenna ports and having a plurality of output beam ports. The multiplex switch network includes a plurality of inputs coupled to the output beam ports of the beamforming network and having a plurality of output radio ports. The radios modulate/demodulate signals. Each of the radios being selectively coupled to the output radio ports of the multiplex switch network based on a predetermined selection. The control circuit controls the multiplex switch network to establish electrical communication between the antenna elements and the radios based on the predetermined selection of one of a plurality of modes including a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
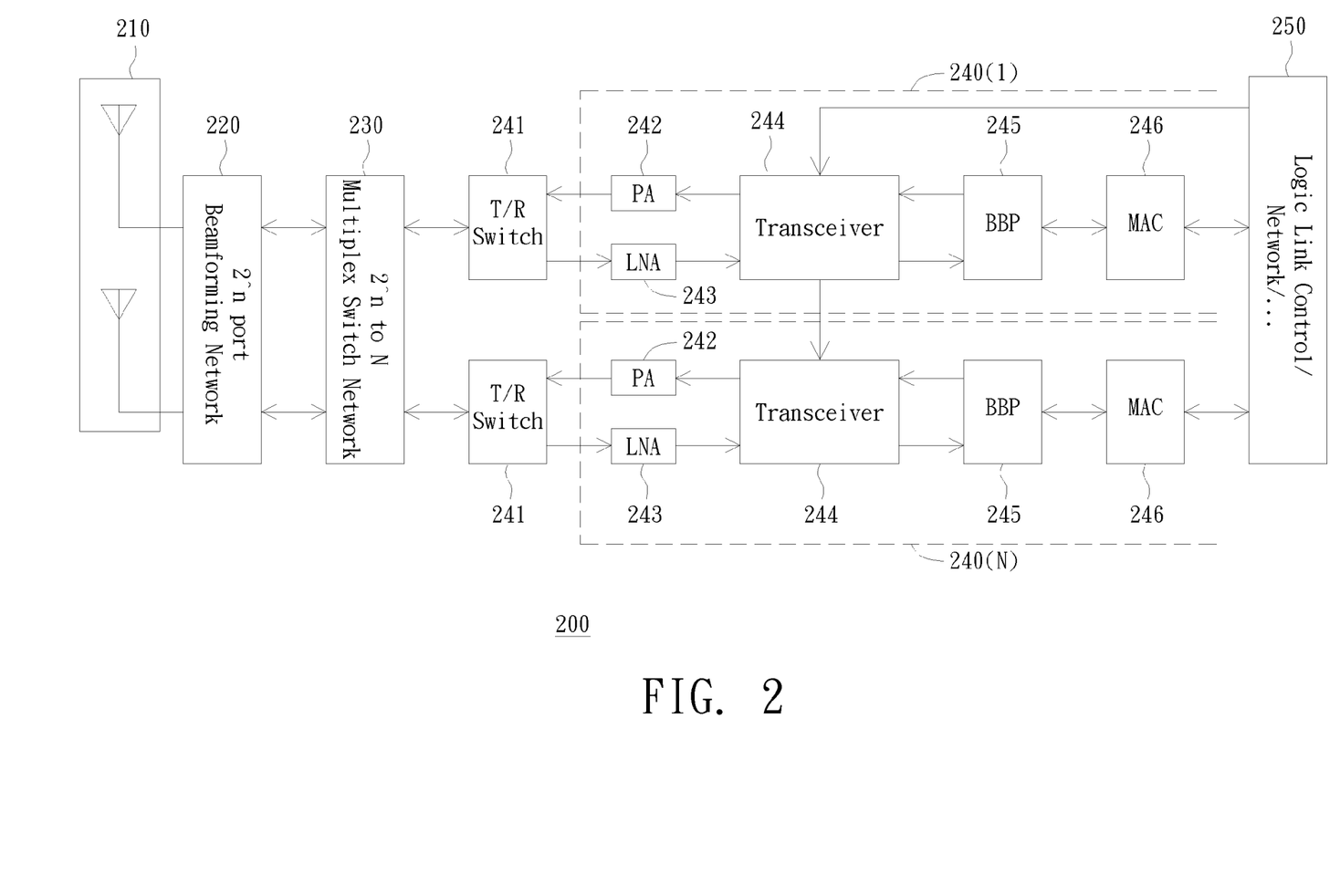
FIG. 2 shows a wireless network apparatus according to a preferred embodiment of the invention.

FIG. 2 shows a wireless network apparatus according to a preferred embodiment of the invention. The wireless network apparatus 200 includes an antenna array 210, a beamforming network 220, a multiplex switch network 230, a plurality of radios 240(1)-240(N), and a control circuit 250.

To reduce co-channel interference and increase capacity of the system, the coverage area of a wireless base station is usually divided into sub-sections. This coverage area division can be implemented with different types of phased antenna array 210, including planar, sectored, quadrate, hexahedral, and octahedral configurations, as later discussed in detail.

The antenna array 210 includes a plurality of antenna elements each having an output antenna port for connecting to the beamforming network 220. The number of antenna elements is a 2's multiple. The antenna array 210 thus has $2^n$ antenna ports corresponding to the respective antenna elements, where n is a positive integer.

The beamforming network 220 has a plurality of inputs coupled to the output antenna ports of the antenna array 210 and has a plurality of output beam ports. The output beam ports of the beamforming network 220 have 1-to-1 correspondence with the antenna ports, and thus also consist of $2^n$ number of beam ports. Preferably, the beamforming network 220 is one selected from the group consisting of Rotman lens, Butler matrix, Wullenweber array, and Blass matrix.

The multiplex switch network 230 has a plurality of inputs coupled to the output beam ports of the beamforming network 220 and has a plurality of output radio ports. The output radio ports are coupled to respective radios 240(1)-240(N). The multiplex switch network 230 allocates operating channels for each of the radios 240(1)-240(N).

The radios 240(1)-240(N) are for modulating/demodulating signals. Each of the radios 240(1)-240(N) is selectively coupled to the output radio ports of the multiplex switch network 230 based on a predetermined selection.

The control circuit 250 controls the multiplex switch network 230 to establish electrical communication between the antenna elements of the antenna array 210 and the radios 240(1)-240(N) based on the predetermined selection of one of a plurality of modes, including a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage, thereby completing channel allocation for the radios 240.

Figure 3:
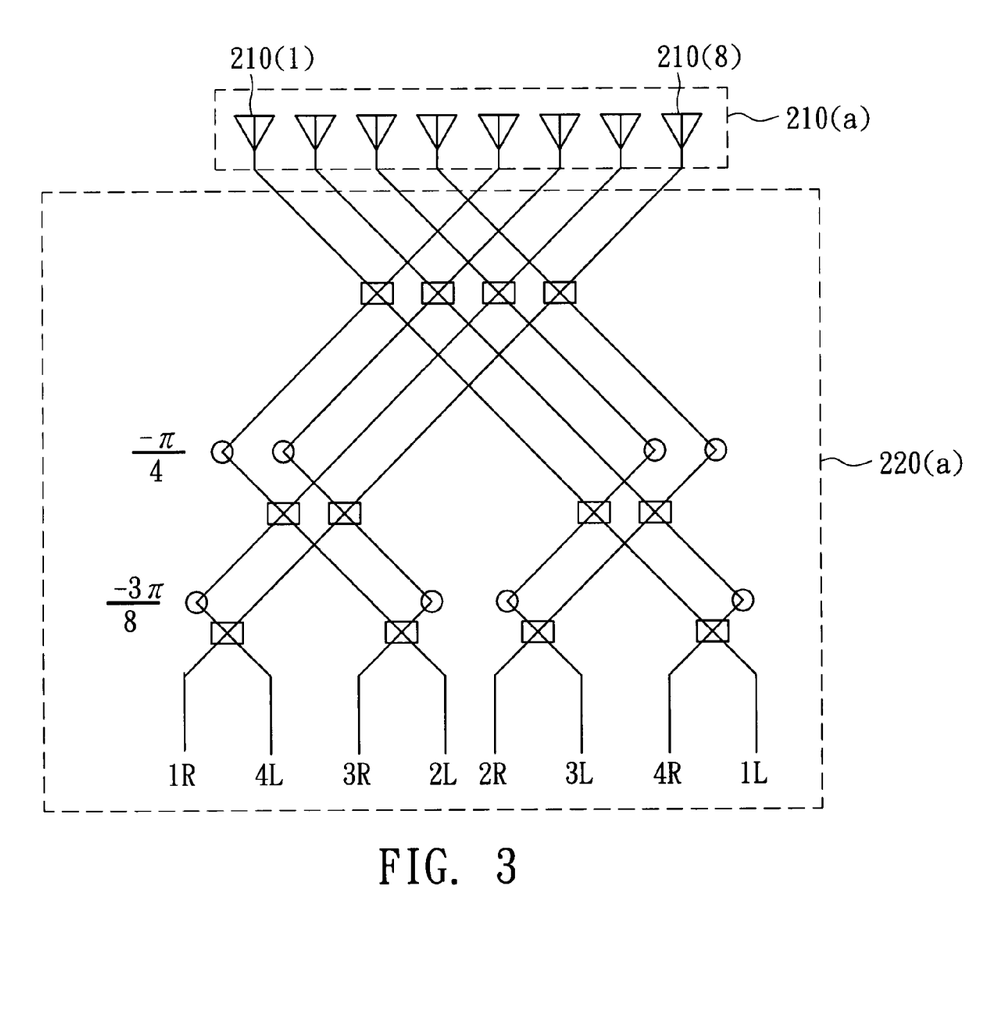
FIG. 3 shows a detailed view of a beamforming network according to an embodiment of the invention.

FIG. 3 shows a detailed view of a beamforming network according to an embodiment of the invention. In this embodiment, the beamforming network 220 is a Butler matrix, denoted as 220(a), that uses a combination of 90° hybrid couplers and phase shifters, represented by rectangles and circles, respectively.

Each of the beams formed at the beam ports (denoted as a number followed by a letter "R" or "L") can be allocated for use by the radios 240(1)-240(N) via the multiplex switch network 230.

The 8×8 Butler matrix 220(a) is shown feeding the antenna array 210(a) of having eight antenna elements 210(1)-210(8). The antenna elements 210(1)-210(8) are spaced apart by a distance of λ/2. The Butler matrix-fed planar phased array 210(a) has a coverage area of 120°, and is further divided into beams with beamwidth of 15°.

Figure 4:
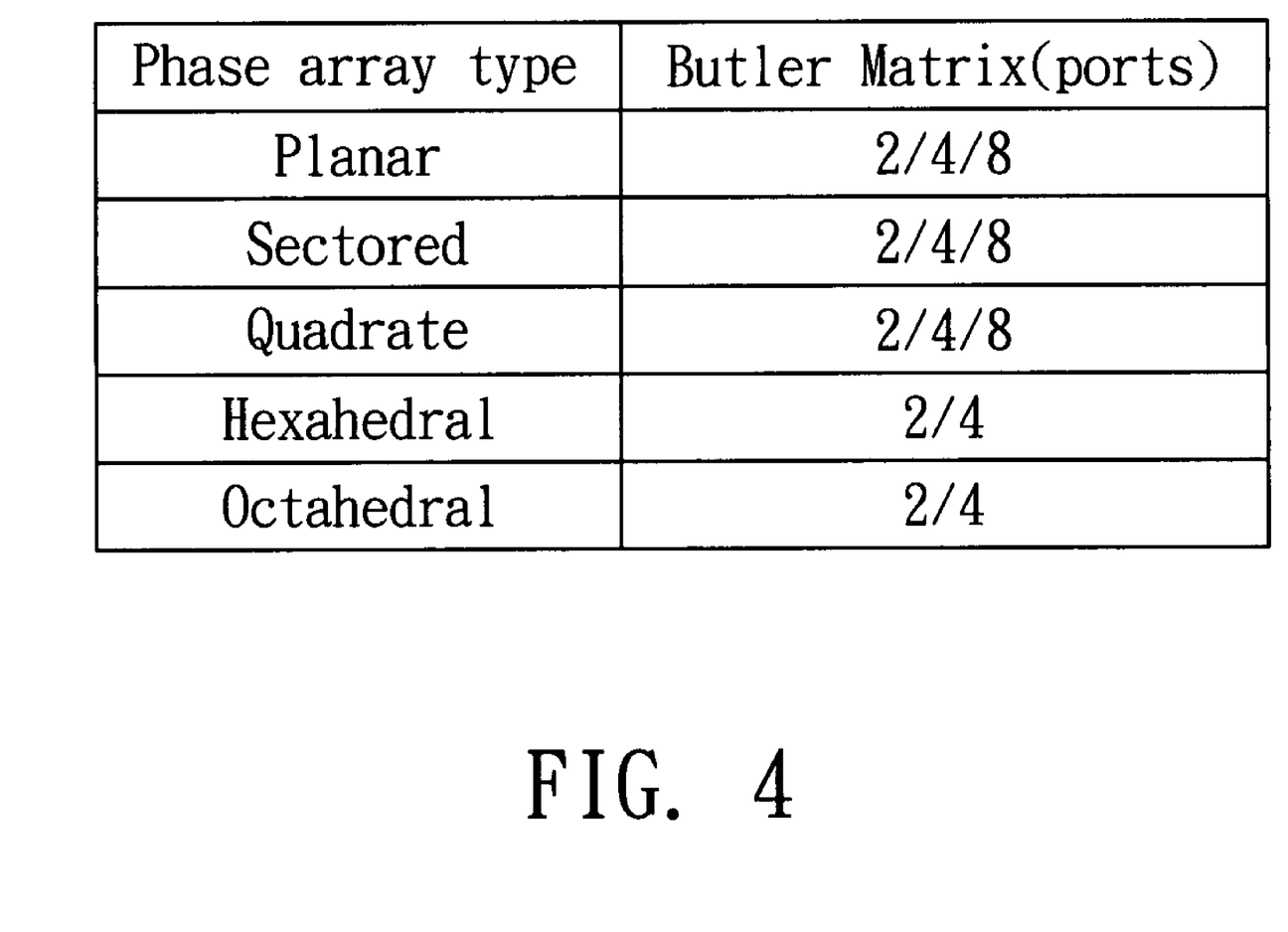
FIG. 4 shows a list of combination of port and phase array types.

FIG. 4 shows a list of combination of port and phase array types. The list is by no means exhaustive. The phase array types include planar, sectored, quadrate, hexahedral, and octahedral. The Butler matrix 220(a) can include different port numbers that together with the different combination of phase array types form a coverage of up to 360°. The selection of the phase array type and the number of Butler matrix ports depend on the application.

Figure 5:
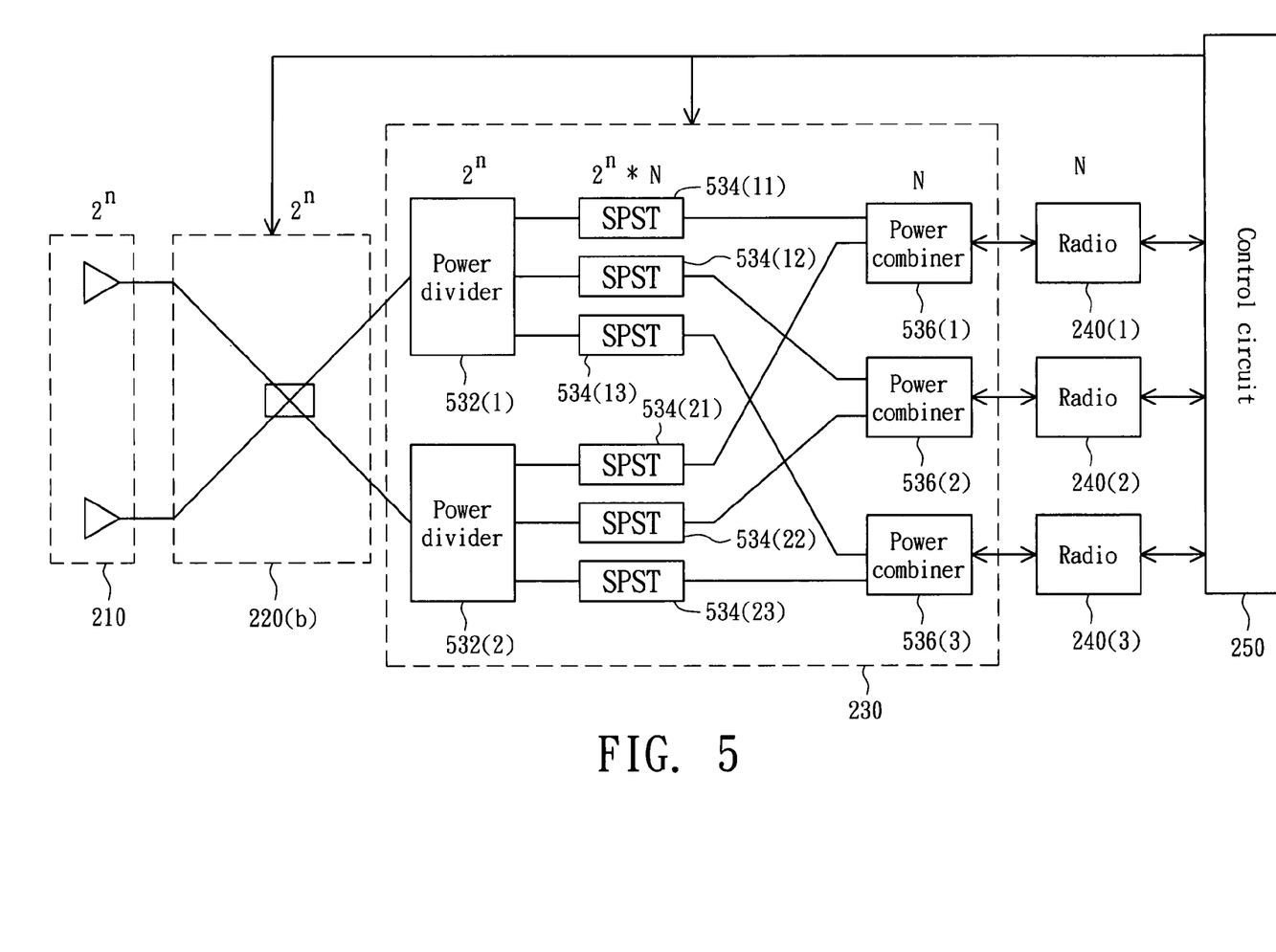
FIG. 5 shows a detailed view of a multiplex switch network.

FIG. 5 shows a detailed view of a multiplex switch network. In this embodiment, the multiplex switch network 230 is configured for channel allocation by connecting $2^n$ (n=1) output beam ports to the N (=3) radio ports based on a predetermined selection for optimizing spectrum and pattern efficiencies. The multiplex switch network 230 is shown coupled to a 2-port Butler matrix 220(b) feeding a 2-element antenna array 210(b) at its input, and coupled to the radios 240 which in turn connect to the control circuit 250 at its output.

The multiplex switch network 230 includes power dividers 532, single-pole-single-throw (SPST) switches 534, and power combiners 536. The $2^n$ number of power dividers 532(1) and 532(2) are respectively coupled to the $2^n$ number of output beam ports (1L and 1R) of the Butler matrix 220(b) at the inputs. The power dividers 532(1) and 532(2) are coupled to SPST switches 534 at the outputs. Each of the power dividers 532 is coupled to respective N number of SPST switches 534, thus summing up to $(2^n) \times N$ SPST switches in total. The SPST switches 534 split the power of each beam generated by the beam ports 1L and 1R evenly and output the power to the radios 240(1)-240(3) via power combiners 536.

Figure 6A:
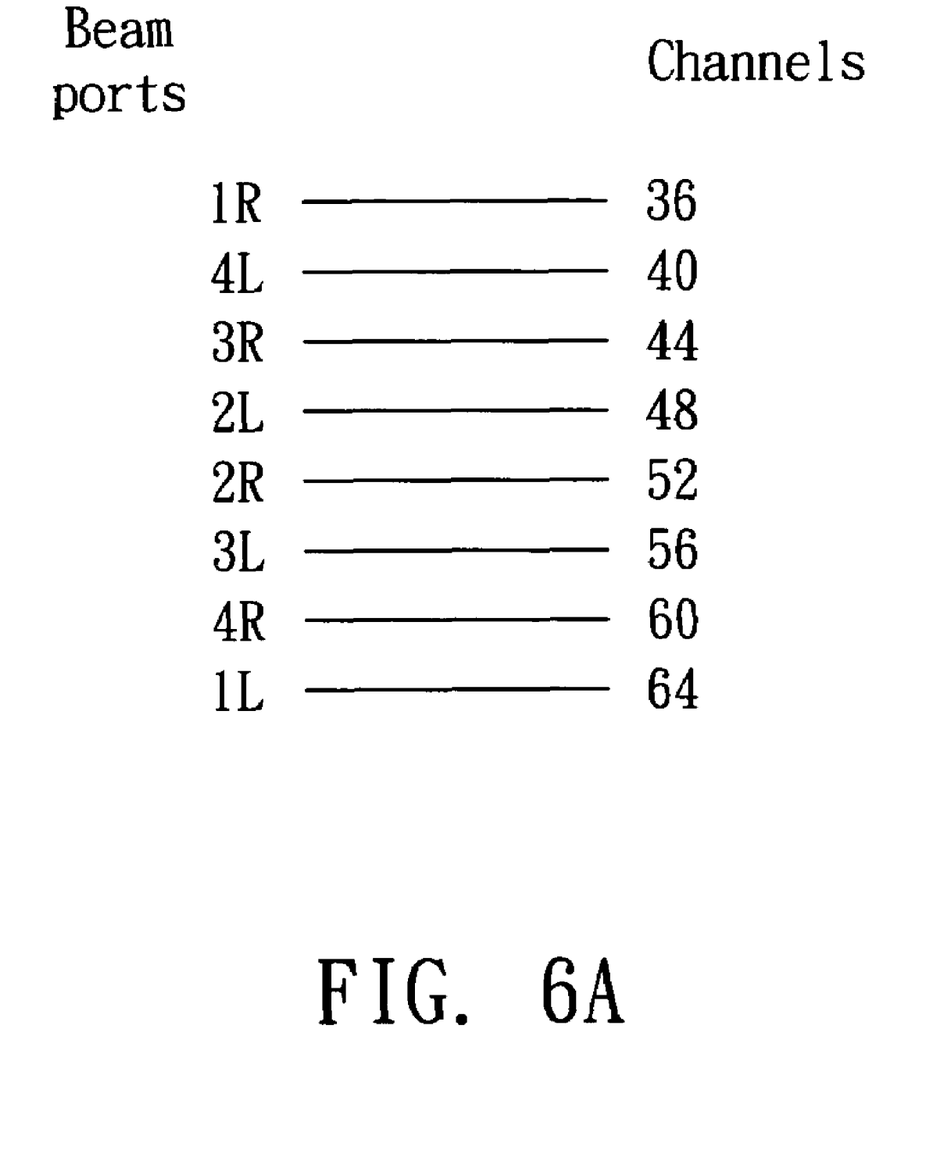
FIGS. 6A, 6B, 6C and 6D show the multiplex switch network operating in the first mode of PtP linkage, the second mode of MPtP linkage, the third mode of PtMP linkage, and the fourth mode MPtMP linkage, respectively.

The multiplex switch network 230 can operate in four modes of predetermined selection. FIG. 6A shows the multiplex switch network operating in the first mode of PtP linkage. The number followed by a letter denotes the output beam ports of the beamforming network 220. The numbers on the right denote channel numbers. In the first mode, the output beam ports are each allocated different channels. That is, the eight radios connecting to the respective beam ports thus operate under different frequencies associated with different channels to optimize space and frequency isolations.

Figure 6B:
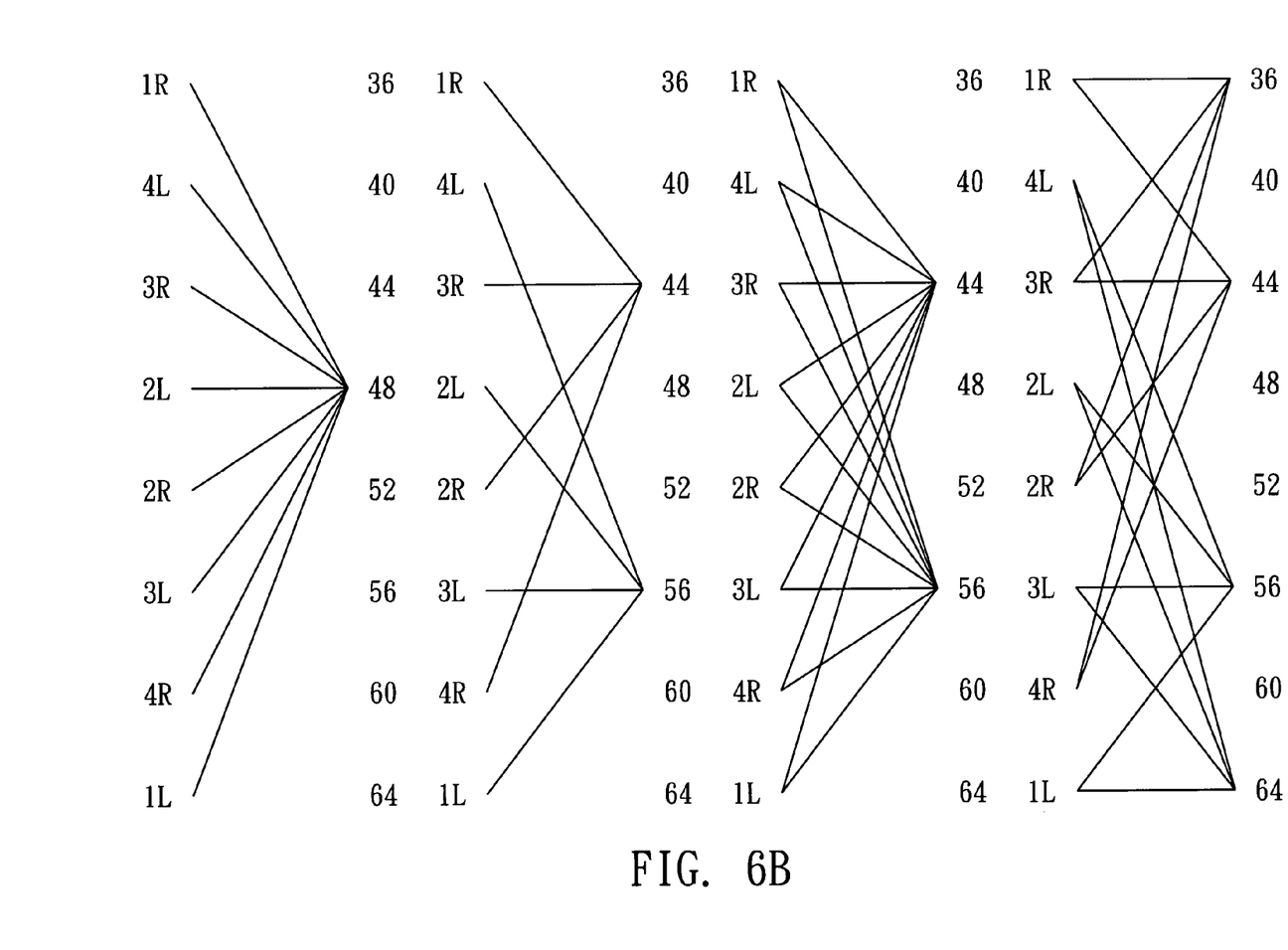

FIG. 6B shows the multiplex switch network operating in the second mode of MPtP linkage. In the second mode, the beam ports are connected to the channels by MPtP linkage. That is, multiple radios operate in the same frequency for optimizing pattern efficiency. By operating under this mode, bandwidth is increased and loading imbalance is decreased.

Figure 6C:
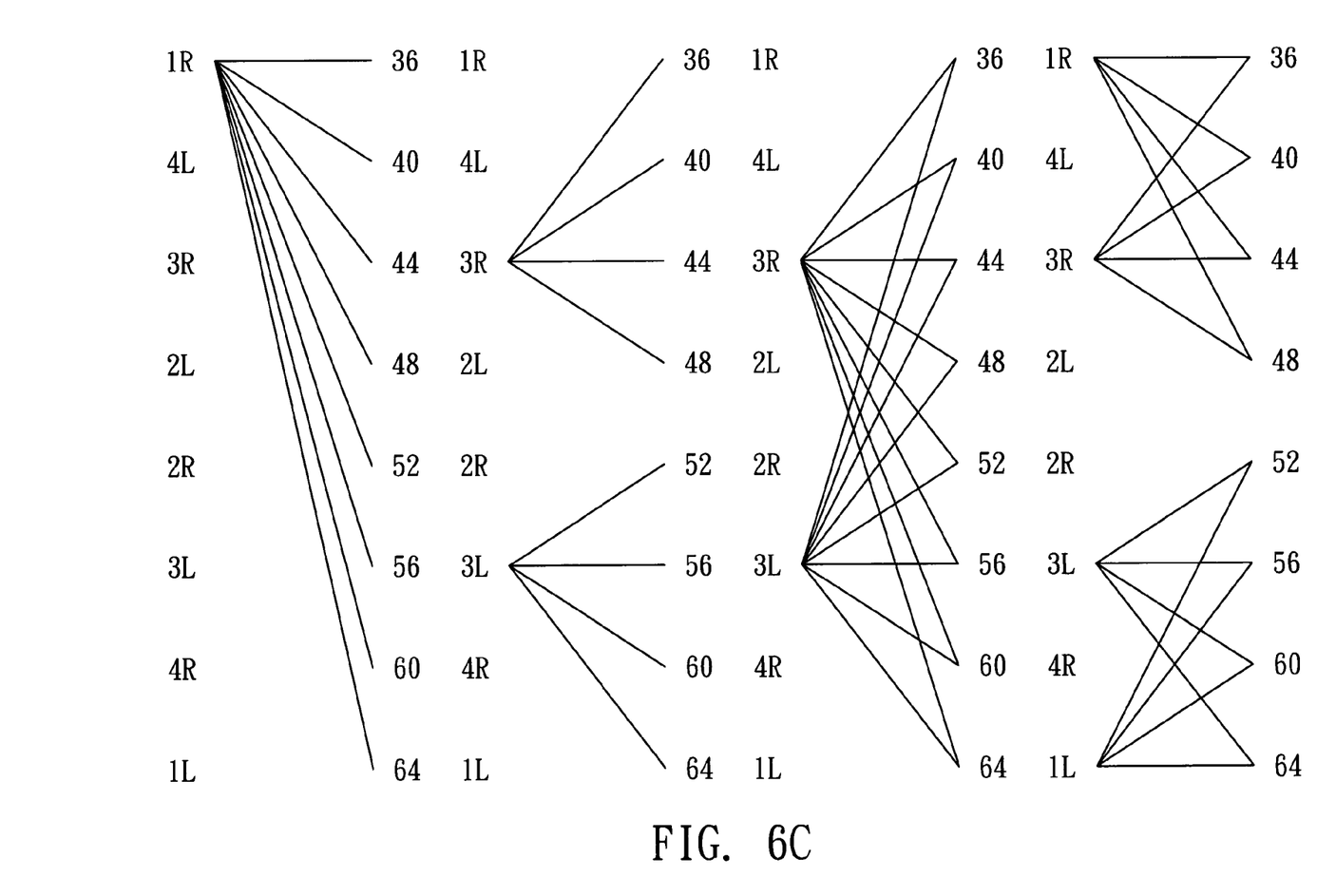

FIG. 6C shows the multiplex switch network operating in the third mode. In the third mode, the beam ports are connected to the channels by PtMP linkage. That is, a radio operates in multiple frequencies for optimizing spectrum efficiency.

Figure 6D:
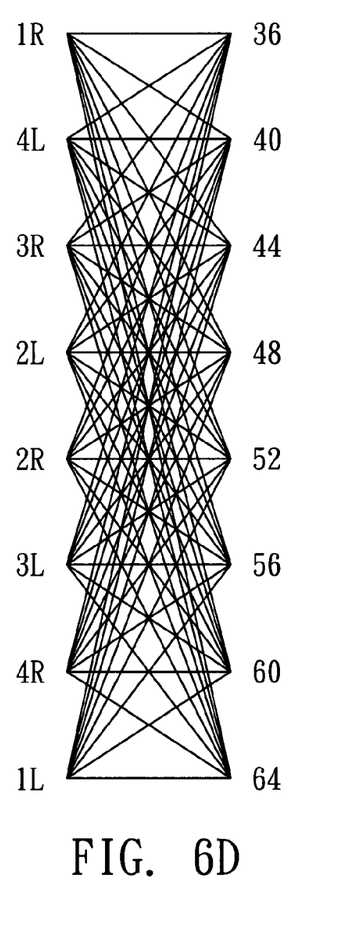

FIG. 6D shows the multiplex switch network operating in the fourth mode. In the fourth mode, the beam ports are connected to the channels by MPtMP linkage. That is, all beam ports can freely operate in any frequency for optimizing link capacity.

Thus, given the predetermined selection of one of the four modes, the appropriate channel allocation scheme can be chosen so as to optimize space and frequency isolation, pattern efficiency, spectrum efficiency, or link capacity.

To further provide space and frequency isolations, orthogonal beams formed by hard-wire equivalent of a discrete Fast Fourier Transform (dFFT) are used in the embodiments of the invention to provide better isolation among beam ports. In addition, well-shielded coaxial cables or well-isolated strip-lines can be used to provide high isolation between each crossover transmission line pair in or out of the Butler Matrix 220. Also, high-isolated power dividers and non-reflective switches can be used to increase isolation among different beam ports and among different radio ports.

Further, channel filters, such as bandpass or band-reject filters, can provide isolation among non-overlapped frequency channels such as Ch. 1, 6, 11 for IEEE 802.11g; Ch. 36, 40, 44, 48, 52, 56, 60, and 64 for 802.11a low/medium bands, and Ch. 149, 153, 157, 161 for 802.11a high band. Also, non-overlapped frequency channels with wide common guard, such as Ch. 1 and 11 for 802.11g, can be used to provide better isolation. Moreover, isolation can be further improved if the operation of the radios is non-concurrent.

Additionally, the embodiments of the invention use the schemes of contiguous phase-arrays plus orthogonal space division multiplex beams, and non-overlapped frequency channels plus orthogonal frequency division multiplex frequency sub-carriers, to provide better space and frequency isolations.

Figure 7:
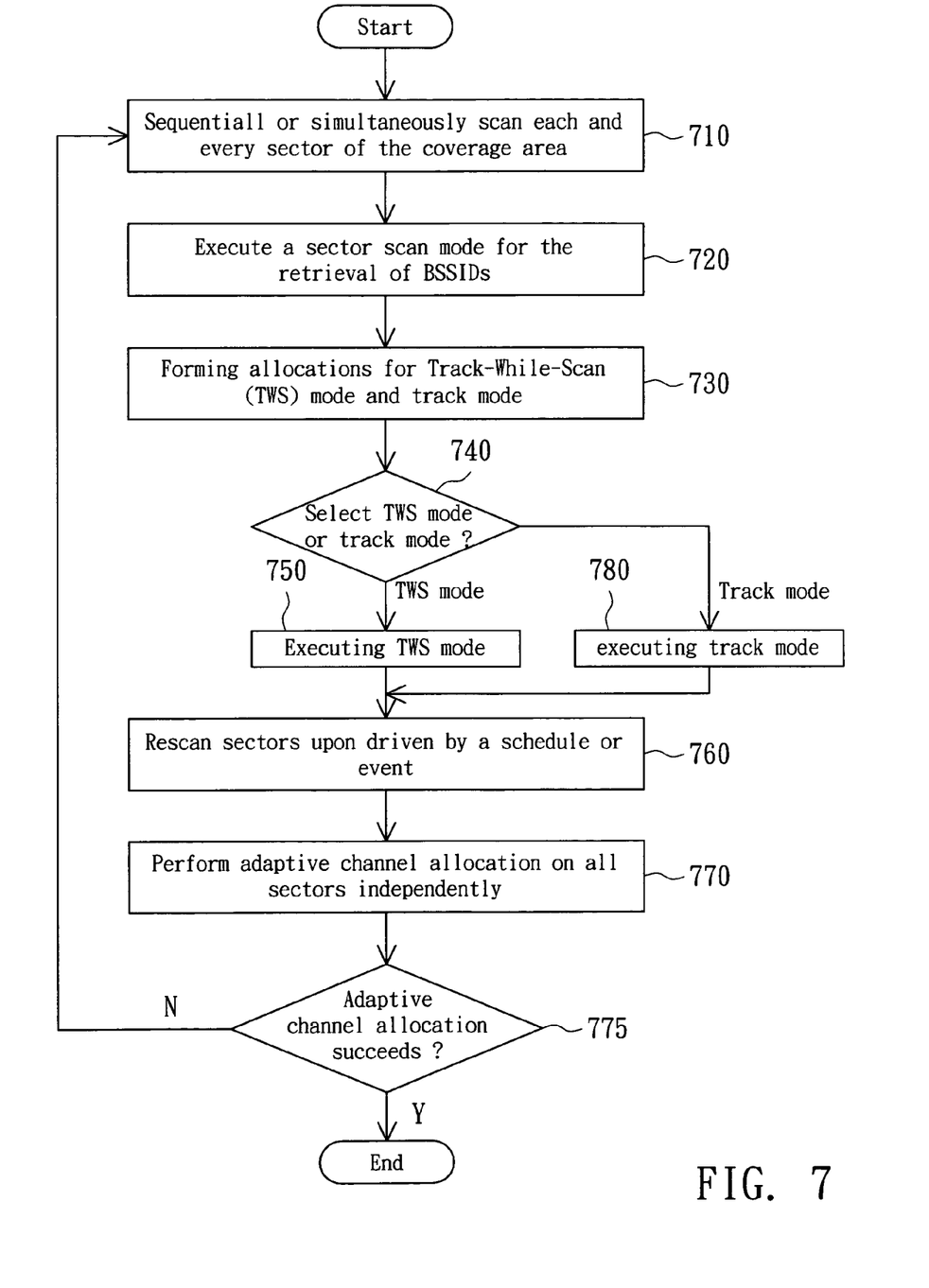
FIG. 7 shows a method of channel allocation for respective radios according to an embodiment of the invention.

The invention further proposes a method of channel allocation for respective radios, as shown in a flow diagram of FIG. 7 according to an embodiment of the invention. The method begins upon triggering by command or power-on. Each and every sector of the coverage area is sequentially or simultaneously scanned, as shown in step 710.

The method then continues at step 720 in which a sector scan mode is executed for the retrieval of BSSIDs belonging to each beam of a particular channel in the sectors.

Next, at step 730, allocations for Track-While-Scan (TWS) mode and track mode are formed based on the characterizing information for every BSSID located and a plurality of predetermined channel allocation modes.

Thereafter, step 740 is performed to determine whether the TWS mode or track mode is to be selected for execution. The TWS mode is selected for best matching with the scanned site of the present sector. The track mode is selected for the best application among the four modes of predetermined selection.

If the TWS mode is selected, the method continues at step 750. At step 750, the TWS mode is executed with the actions for adaptation to thereby balance traffic loading.

Alternatively, if the track mode is selected, the method instead proceeds to step 780 from step 740. The operating mode is selected from the four modes of predetermined selection that best matches the characterizing information associated with each located BSSID, and is comparatively more purpose driven and goal oriented. That is, the first mode optimizes space and frequency isolations; the second mode optimizes pattern efficiency; the third mode optimizes spectrum efficiency; and the fourth mode optimizes link capacity.

Following step 750 or 780, the method then continues at step 760. At step 760, the sectors are rescanned upon driven by a schedule or event as an additional effort to recover lost beam and balance loading.

At step 770, adaptive channel allocation is performed on all sectors independently. That is, all sectors with the plurality of MAC (media access control) layers execute different channel allocation in either the track mode or the TWS mode with related actions for adaptation. The media from the MAC layers are then handled by logical link controlling and/or networking. At step 775, if the adaptive channel allocation succeeds, the method ends; if not, step 710 is returned.

Figure 8:
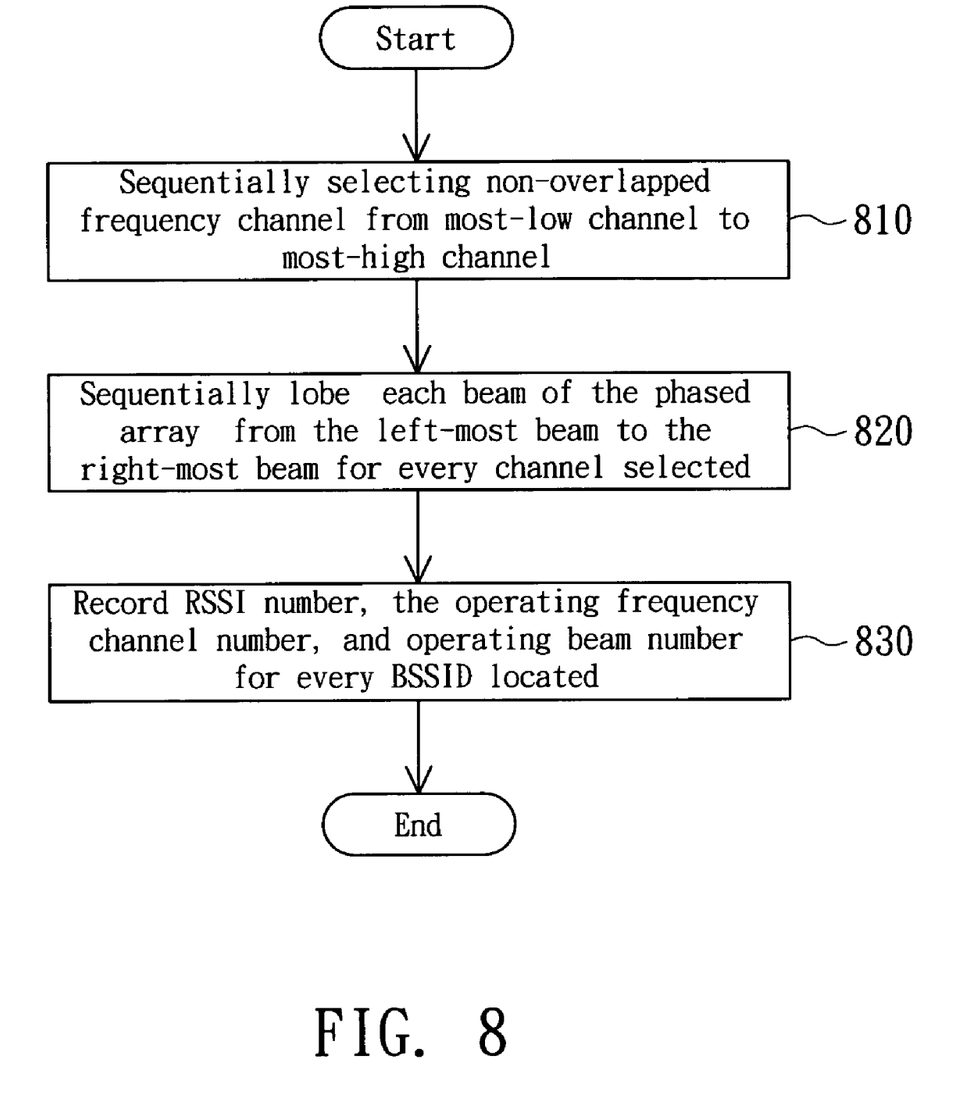
FIG. 8 shows flow diagram of the sub-steps of step 720.

FIG. 8 shows flow diagram of the sub-steps of step 720. The sector scan mode begins at step 810 in which non-overlapped frequency channel is sequentially selected from most-low channel to most-high channel.

Then, at step 820, for every channel selected, each beam of the phased array is sequentially lobed from the left-most beam to the right-most beam.

Then, at step 830, for every basic service station ID (BSSID) located, the RSSI number, the operating frequency channel number for each active station (STA) associated with the BSSIDs (i.e. spectrum), and operating beam number (i.e. pattern), are being recorded. Step 830 is repeated until all beams are lobed and all non-overlapped frequency channels are selected and scanned.

Figure 9:
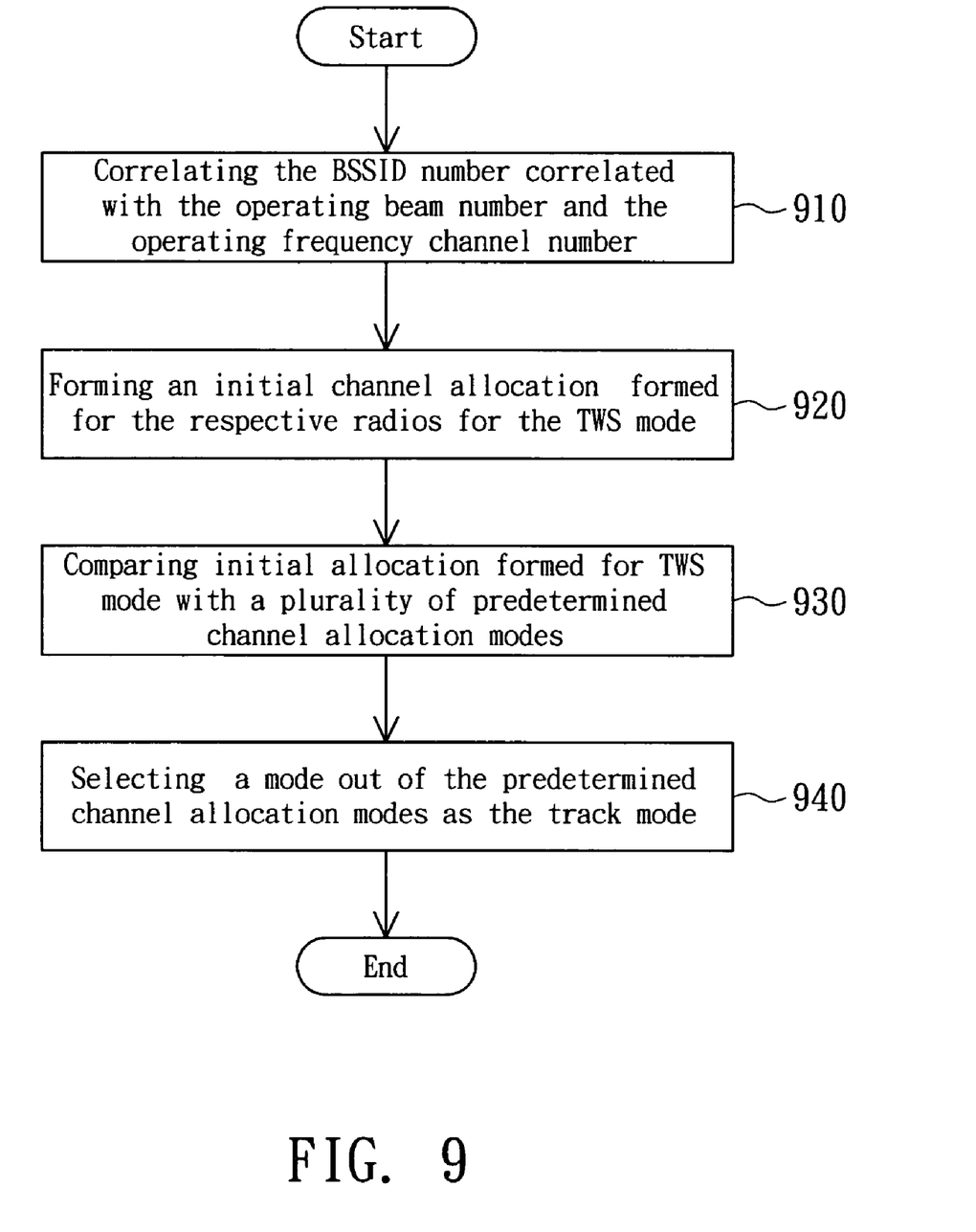
FIG. 9 shows flow diagram of the sub-steps of step 730 in forming allocations for the TWS mode and track mode.

FIG. 9 shows flow diagram of the sub-steps of step 730 in forming allocations for the TWS mode and track mode. At step 910, the BSSID number is correlated with the operating beam number and the operating frequency channel number.

Then, at step 920, an initial channel allocation is formed for the respective radios for the TWS mode. The allocation is made to match with all the different correlations determined at step 910.

Next, at step 930, the initial allocation formed for TWS mode is compared with a plurality of predetermined channel allocation modes that include a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage.

Then, at step 940, a mode out of the predetermined channel allocation modes is selected as the track mode that best characterizes the initial channel allocation.

Figure 10:
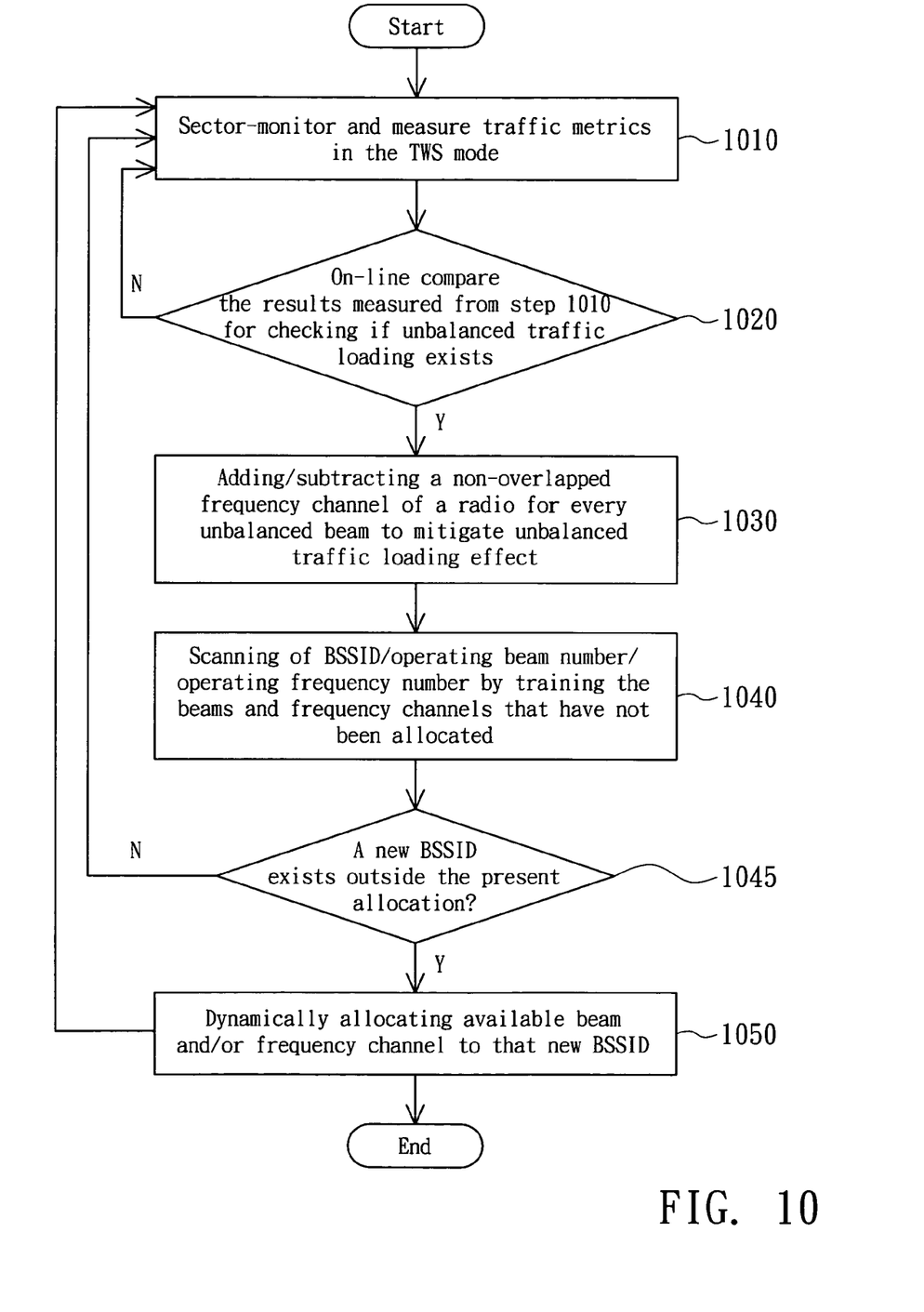
FIG. 10 shows flow diagram of the sub-steps of step 750 for the performing of TWS mode.

FIG. 10 shows flow diagram of the sub-steps of step 750 for the performing of TWS mode. The method begins at step 1010 to configure the beam ports in connection with the channels based on the channel allocation for the TWS mode, and to sector-monitor and measure traffic metrics, such as throughput, packet loss cycle, delay and/or jitter; meanwhile, the wireless network apparatus 200 is operating in normal transmission, reception, or other mandated actions.

Then, at step 1020, on-line comparison is performed on the results measured from step 1010 for checking if unbalanced traffic loading exists, or if a traffic metric indicates a traffic overload or under-load. If yes, step 1030 is processed; if not, step 1010 is processed.

Next, at step 1030, for every unbalanced beam, a non-overlapped frequency channel of a radio is added or subtracted therefrom to thereby mitigate the unbalanced traffic loading effect by trial and error. That is, an adjacent beam related to the unbalanced frequency channel is increased or decreased and the traffic metrics are subsequently checked, and this process is iteratively repeated until the traffic loading is balanced.

While step 1030 is processed, step 1040 is in parallel performed for the scanning of BSSID/operating beam number/operating frequency number by training the beams and frequency channels that have not been allocated and therefore, in step 1045, it is determined whether a new BSSID exists outside the present allocation. If no new BSSIDs are found, step 1010 is returned for further traffic monitoring and measuring. If a new BSSID is found, then step 1050 is performed for dynamically allocating available beam and/or frequency channel to that new BSSID.

Figure 11:
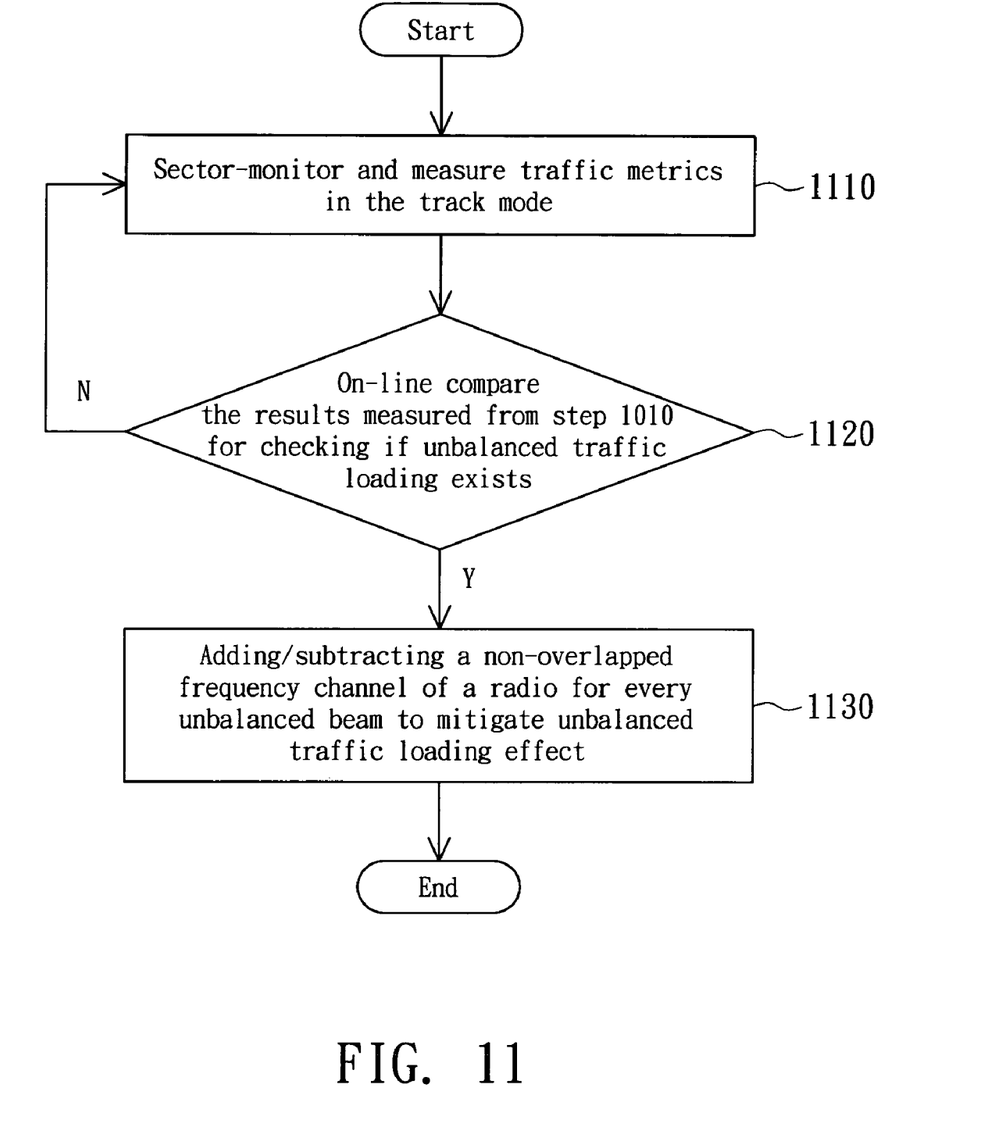
FIG. 11 shows a flow diagram of the sub-steps of step 780 undergoing the track mode.

FIG. 11 shows a flow diagram of the sub-steps of step 780 undergoing the track mode. First, at step 1110, the beam ports are configured in connection with the channels based on the channel allocation for the track mode. Traffic metrics, such as throughput, packet loss cycle, delay and/or jitter are sector-monitored and measured while having the wireless network apparatus 200's to operate in normal transmission, reception, or other mandated actions.

Then, at step 1120, on-line comparison is performed on the results measured from step 1110 to check 1) if unbalanced traffic loading effect exists, or 2) if a traffic metric indicates a traffic overload or under-load. If neither of the two conditions are satisfied, then step 1110 is returned for additional monitoring and measuring, else step 1130 is processed.

Then, at step 1130, for every unbalanced beam, a non-overlapped frequency channel of a radio is added or subtracted from that unbalanced beam to thereby mitigate the unbalanced traffic loading by trial and error. That is, an adjacent beam related to the unbalanced frequency channel is increased or decreased and the traffic metrics are subsequently checked, and this process is iteratively repeated until the traffic loading is balanced.

Comparing the sub-steps of the TWS mode in FIG. 10 and of the track mode in FIG. 11, it is observed that the track mode lacks the more adaptive lost beam recovering steps present in FIG. 10 (steps 1040 and 1050). However, the track mode is sometimes preferred over the TWS mode for more goal oriented and purpose driven tasks. For instance, the first mode of the predetermined selection can be selected as the track mode for wireless switch application (a new application in WLAN); the second mode of the predetermined selection can be selected as the track mode for wireless hub (or the Access Point in WLAN) application; the third mode of the predetermined selection can be selected as the track mode for bridge application, and the fourth mode of the predetermined selection can be selected as the track mode for mesh application.

Conclusively, by applying the wireless network apparatus and the method of channel allocation for respective radios according to the embodiments of the invention, pattern and spectrum efficiencies are increased. Also, the embodiments of the invention, being the apparatus and the method, provide adaptive selection of the beams and frequency channels to effectively balance traffic loading.

The embodiments of the invention effectively solve the problems associated with conventional wireless switch systems. The embodiments of the invention provide adaptation for beam and/or frequency channel allocation to optimize pattern and/or spectrum efficiencies, and provide controllable and effective isolations among beams and/or frequency channels. Further, the arrangement of the plurality of radios according to the embodiment of the invention can both provide array gain to extend link range, and provide multiple bandwidths to extend link throughput.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless network apparatus, comprising:
   an antenna array, comprising a plurality of antenna elements each having an output antenna port;
   a beamforming network having a plurality of inputs coupled to the output antenna ports and having a plurality of output beam ports;
   a multiplex switch network having a plurality of inputs coupled to the output beam ports of the beamforming network and having a plurality of output radio ports;
   a plurality of radios, for modulating/demodulating signals, each of the radios being selectively coupled to the output radio ports of the multiplex switch network based on a predetermined selection; and
   a control circuit, for controlling the multiplex switch network to establish electrical communication between the antenna elements and the radios based on the predetermined selection of one of a plurality of modes including a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage.

2. The wireless network apparatus according to claim 1, wherein the beamforming network is one selected from the group consisting of Rotman lens, Butler matrix, Wullenweber array, and Blass matrix.

3. The wireless network apparatus according to claim 1, wherein the number of the output beam ports and the number of the output radio ports are both equal to n, the multiplex switch network comprising n Single-Pole-Single-Throw (SPST) switches for connecting the n number of the antenna elements to the radios, wherein n is a positive integer.

4. The wireless network apparatus according to claim 1, wherein the multiplex switch network selectively operates in the first mode if it is desired to optimize space and frequency isolations.

5. The wireless network apparatus according to claim 1, wherein the multiplex switch network selectively operates in the second mode if it is desired to optimize efficiency of beam pattern formed by the beamforming circuit.

6. The wireless network apparatus according to claim 1, wherein the multiplex switch network selectively operates in the third mode if it is desired to optimize spectrum efficiency.

7. The wireless network apparatus according to claim 1, wherein the multiplex switch network selectively operates in the fourth mode if it is desired to optimize link capacity.

8. A method of channel allocation for respective radios, comprising:
   scanning within sectors of a phased array for retrieval of BSSIDs belonging to each beam of a particular channel in the sectors;
   recording corresponding characterizing information, including RSSI number, operating beam number, and operating frequency channel number, for every BSSID located;
   correlating the BSSID number with the operating beam number and the operating frequency channel number to form an initial channel allocation for the respective radios;
   comparing the initial channel allocation with a plurality of predetermined channel allocation modes that include a first mode of Point-to-Point (PtP) linkage, a second mode of MultiPoint-to-Point (MPtP) linkage, a third mode of Point-to-MultiPoint (PtMP) linkage, and a fourth mode of MultiPoint-To-MultiPoint (MPtMP) linkage, and selecting a mode out of the predetermined channel allocation modes that best characterizes the initial channel allocation;
   selectively performing a track mode or a track-while-scan (TWS) mode:
   in the track mode, assigning frequency channels to the respective radios based on the selected mode out of the predetermined channel allocation modes, whereby best application among the four predetermined channel allocation modes is achieved;
   in the track-while-scan mode, assigning frequency channels to the respective radios based on the initial channel allocation, whereby best matching with the scanned sectors is achieved;
   monitoring traffic within the sectors; and
   reducing unbalanced loading by adding/subtracting a non-overlapped frequency channel of a radio to an unbalanced beam.

9. The method according to claim 8 further comprising:
   rescanning the sectors having low traffic activity detected during the step of monitoring upon reception of an event.

10. The method according to claim 8 further comprising:
rescanning the sectors having unbalanced traffic loading that can not be mitigated during the step of reducing upon reception of an event.

11. The method according to claim 8 further comprising transferring media received by the phased array to a media access control layer.

12. The method according to claim 8, wherein the step of scanning further comprises:
sequentially selecting each of the non-overlapped frequency channel from lowest channel number to highest channel number; and
sequentially lobbing each beam of the phased array for every one of the selected non-overlapped frequency channel.

13. The method according to claim 8 further comprising:
simultaneously recovering lost beam by dynamically associating a channel to a new BSSID that exists outside the initial channel allocation while performing the step of reducing unbalanced loading under the TWS mode.

* * * * *